US012722075B2

(12) United States Patent
Cockram et al.

(10) Patent No.: US 12,722,075 B2
(45) Date of Patent: Sep. 1, 2026

(54) METHOD, DEVICE, AND SYSTEM OF INPUT FOR A VIDEOGAME CONSOLE

(71) Applicant: Sony Interactive Entertainment Inc., Tokyo (JP)

(72) Inventors: Philip Cockram, London (GB); Michael Eder, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 383 days.

(21) Appl. No.: 18/159,148

(22) Filed: Jan. 25, 2023

(65) Prior Publication Data

US 2023/0241492 A1 Aug. 3, 2023

(30) Foreign Application Priority Data

Feb. 2, 2022 (GB) ...................................... 2201337

(51) Int. Cl.
*A63F 13/235* (2014.01)
*A63F 13/22* (2014.01)
*A63F 13/31* (2014.01)

(52) U.S. Cl.
CPC ............ *A63F 13/235* (2014.09); *A63F 13/22* (2014.09); *A63F 13/31* (2014.09)

(58) Field of Classification Search
None
See application file for complete search history.

(56) References Cited

U.S. PATENT DOCUMENTS 7,435,179 B1 * 10/2008 Ford ..................... A63F 13/216 434/21
2004/0235568 A1 11/2004 Kim
2008/0003951 A1 * 1/2008 Kuwahara ............... A63F 13/92 455/73

(Continued)

FOREIGN PATENT DOCUMENTS

EP 4223378 A1 8/2023

OTHER PUBLICATIONS

YouTube video “How to Remote Play PS5/PS4 games | Streaming on Android/iOS/PC/Mac”—https://www.youtube.com/watch?v=CfsbqbSvi2A to Tech Spurt , Jul. 15, 2021 (Year: 2021).*

(Continued)

*Primary Examiner* — Damon J Pierce
(74) *Attorney, Agent, or Firm* — Fish & Richardson P.C.

(57) ABSTRACT

A method of communication for a plurality of portable communication devices and a videogame console includes installing an app on a first portable communication device, the app adapted to cause the first portable communication device to carry out the steps of identifying a videogame console associated with a user of the first portable communication device, communicating with the videogame console using a first communication protocol supported by the videogame console to receive information from the videogame console, and communicating with one or more of the other of the plurality of portable communication devices using an second, different communication protocol common to the first portable communication device and the one or more other portable communication devices, to relay information from the videogame console.

20 Claims, 4 Drawing Sheets

(56) References Cited

U.S. PATENT DOCUMENTS

| | | | | |
|---|---|---|---|---|
| 2009/0305789 | A1* | 12/2009 | Patil | A63F 13/533 463/40 |
| 2011/0212773 | A1 | 9/2011 | Hjelm | |
| 2011/0230269 | A1 | 9/2011 | Serafat et al. | |
| 2013/0316811 | A1 | 11/2013 | Azuma et al. | |
| 2013/0318247 | A1* | 11/2013 | Liu | H04L 67/52 709/227 |
| 2015/0280986 | A1 | 10/2015 | Abuan | |
| 2018/0207526 | A1 | 7/2018 | Lim | |
| 2019/0036989 | A1* | 1/2019 | Eirinberg | H04L 67/34 |

OTHER PUBLICATIONS

Extended European Search Report for corresponding EP Application No. 23153116, 8 pages, dated Apr. 19, 2023.

Pratik Rajiv Patil: "How to join PS5 or PS4 Party Chat on phone ?", Digi Statement, URL:https://digistatement.com/how-to-join-ps5-or-ps4-party-chat-on-phone/, 3 pages, Jul. 3, 2021. (For relevancy see Non-Pat. Lit. #1).

Keith Broni: "How emojis work on Sony PS5", Emojipedia, URL:https://blog.emojipedia.org/how-emojis-work-on-sony-ps5/ 11 pages, May 15, 2021. (For relevancy see Non-Pat. Lit. #1).

Combined Search and Examination Report for corresponding GB Application No. 2201337.9, 7 pages, dated Aug. 1, 2022.

Examination Report for corresponding GB Application No. 2201337.9, 4 pages, dated Apr. 12, 2024.

"PlayStation Remote Play on mobile devices," https://web.archive.org/web/20210413025014/https:/www.play station.com/en-gb/support/games/playstation-remote-play-on-mobile-devices, 8 pages, dated Apr. 13, 2021. (For relevancy, see Non-Pat. Lit. #1.).

EP23153116.1 , "Communication Pursuant to 94(3) EPC", Dec. 17, 2024, 6 pages.

"Sony Computer Entertainment Announces North American and European Release of PlayStation® App, a New Application that Enhances the PlayStation04 Experience", Sony Interactive Entertainment, Oct. 28, 2013, 6 pages.

Broni , "How Emojis Work on Sony PS5", Emojipedia, May 15, 2021, 11 pages.

Patil , "How to Join PS5 or PS4 Party Chat on Phone?", PlayStation, Learn How to Join PS5 or PS4 Party Chat on phone, Jul. 3, 2021, 3 pages.

* cited by examiner

METHOD, DEVICE, AND SYSTEM OF INPUT FOR A VIDEOGAME CONSOLE

BACKGROUND OF THE INVENTION

Field of the Invention

The present invention relates to a method, device, and system of input for a videogame console.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Videogames are commonly social activities, with many users playing the same instance of a game. Some multiplayer games are designed so that individual users of a respective videogame console each share a common virtual space with other, remotely located users. However, others are designed so that multiple players can share a single videogame console.

For these latter types of game, some issues may arise. Firstly, where respective players need respective viewpoints or other game information, this can require that the image output to a television is split into two, three, four or more views, making each viewpoint smaller and the screen more crowded.

In addition, it is necessary for each of these players to have their own controller in order to interact with the videogame console.

The present invention seeks to mitigate or alleviate these problems.

SUMMARY OF THE INVENTION

Various aspects and features of the present invention are defined in the appended claims and within the text of the accompanying description.

In a first aspect, a method of communication for a plurality of portable communication devices and a videogame console is provided in accordance with claim 1.

In another aspect, a computer program is provided in accordance with claim 8.

In another aspect, a first portable communication device is provided in accordance with claim 9.

In another aspect, a videogame console input system is provided in accordance with claim 15.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A method, device, and system of input for a videogame console are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
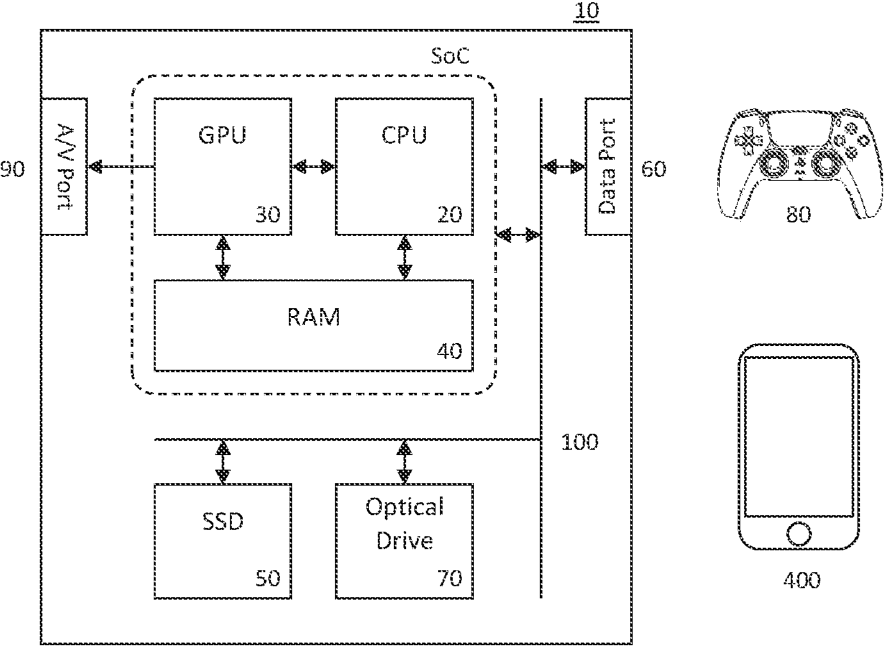
FIG. 1 is a schematic diagram of a videogame console in accordance with embodiments of the present description.

Referring now to the drawings, wherein like reference numerals designate identical or corresponding parts throughout the several views, FIG. 1 shows an example of videogame console 10 such as the Sony® PlayStation 5 ® (PS5).

The videogame console 10 comprises a central processor 20. This may be a single or multi core processor, for example comprising eight cores as in the PS5. The videogame console also comprises a graphical processing unit or GPU 30. The GPU can be physically separate to the CPU, or integrated with the CPU as a system on a chip (SoC) as in the PS5.

The videogame console also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The videogame console may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the videogame console are typically provided through one or more A/V ports 90, or through one or more of the wired or wireless data ports 60.

Where components are not integrated, they may be connected as appropriate either by a dedicated data link or via a bus 100.

In addition, the videogame console may communicate with a first portable communication device 400, using a first communication protocol supported by the videogame console, as described later herein.

Figure 2:
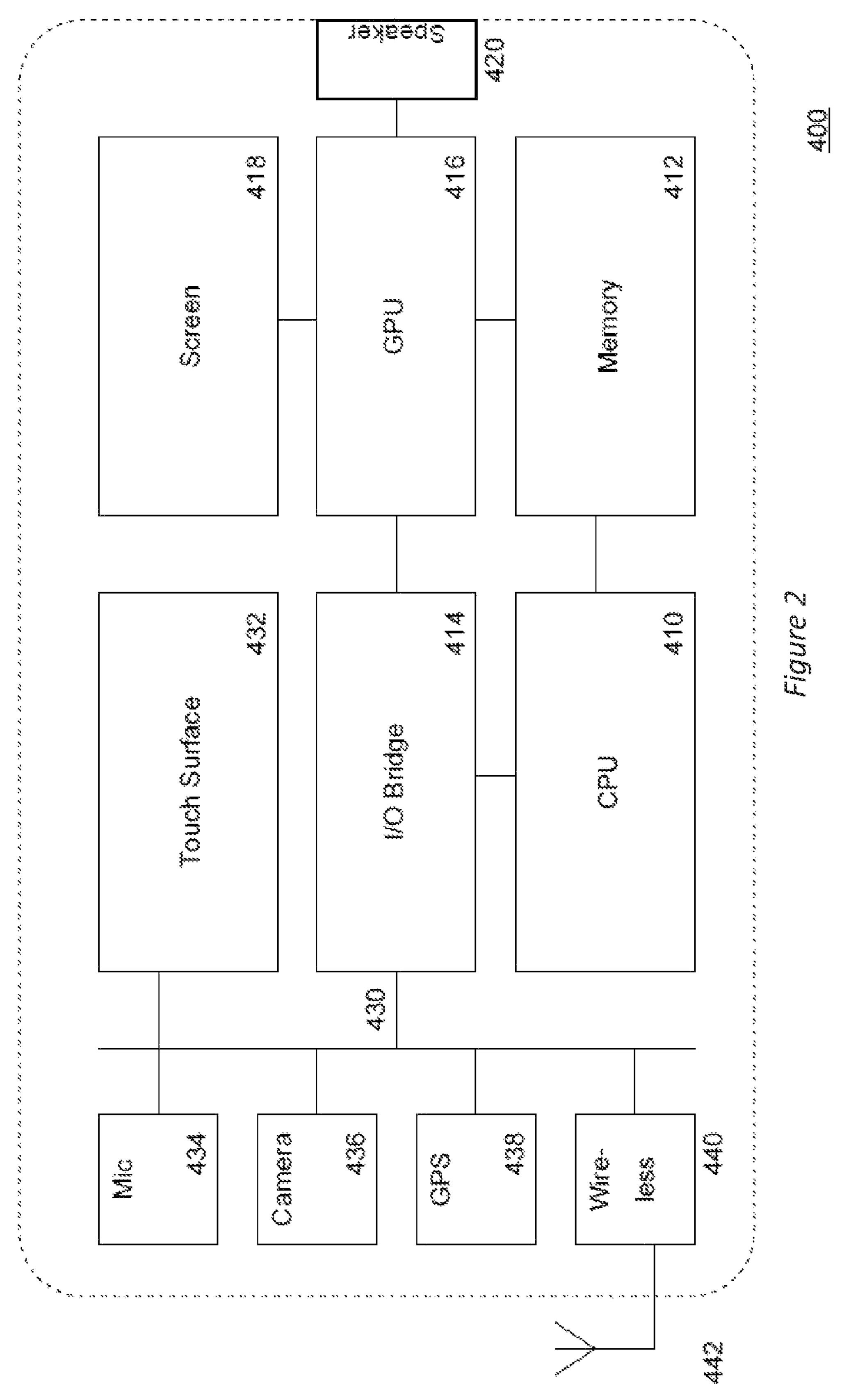
FIG. 2 is a schematic diagram of a portable communication device in accordance with embodiments of the present description.

Turning now to FIG. 2, a typical portable communication device 400 such as a smart phone or tablet comprises a central processing unit (CPU) (410). The CPU may communicate with components of the smart phone either through direct connections or via an I/O bridge 414 and/or a bus 430 as applicable.

In the example shown in FIG. 2, the CPU communicates directly with a memory 412, which may comprise a persistent memory such as for example Flash® memory for storing an operating system and applications (apps), and volatile memory such as RAM for holding data currently in use by the CPU. Typically persistent and volatile memories are formed by physically distinct units (not shown). In addition, the memory may separately comprise plug-in memory such as a microSD card, and also subscriber information data on a subscriber information module (SIM) (not shown).

The smart phone may also comprise a graphics processing unit (GPU) 416. The GPU may communicate directly with the CPU or via the I/O bridge, or may be part of the CPU. The GPU may share RAM with the CPU or may have its own dedicated RAM (not shown) and is connected to the display 418 of the mobile phone. The display is typically a liquid crystal (LCD) or organic light-emitting diode (OLED) display, but may be any suitable display technology, such as e-ink. Optionally the GPU may also be used to drive one or more loudspeakers 420 of the smart phone.

Alternatively, the speaker may be connected to the CPU via the I/O bridge and the bus. Other optional components of the smart phone may be similarly connected via the bus, including a touch surface 432 such as a capacitive touch surface overlaid on the screen for the purposes of providing a touch input to the device, a microphone 434 for receiving speech from the user, one or more cameras 436 for capturing images, a global positioning system (GPS) unit 438 for obtaining an estimate of the smart phones geographical position, and wireless communication means 440.

The wireless communication means 440 may in turn comprise several separate wireless communication systems adhering to different standards and/or protocols, such as Bluetooth® (standard or low-energy variants), near field communication and Wi-Fi®, and also phone based communication such as 2G, 3G, 4G, and/or 5G.

The device is typically powered by a battery (not shown) that may be chargeable via a power input (not shown) that in turn may be part of a data link such as USB (not shown).

In general a suitable portable communication device (400) such as smart phone will comprise a CPU and a memory for storing and running an app, and wireless communication means operable to instigate and typically maintain wireless communication with the videogame console. It will be appreciated however that the mobile communication device may be any device that has these capabilities, such as a tablet, laptop, or the like.

In embodiments of the present description, a first portable communication device 400 comprises a support app 501. The support app is typically downloaded from an app store, but may be installed at manufacture.

Figure 3:
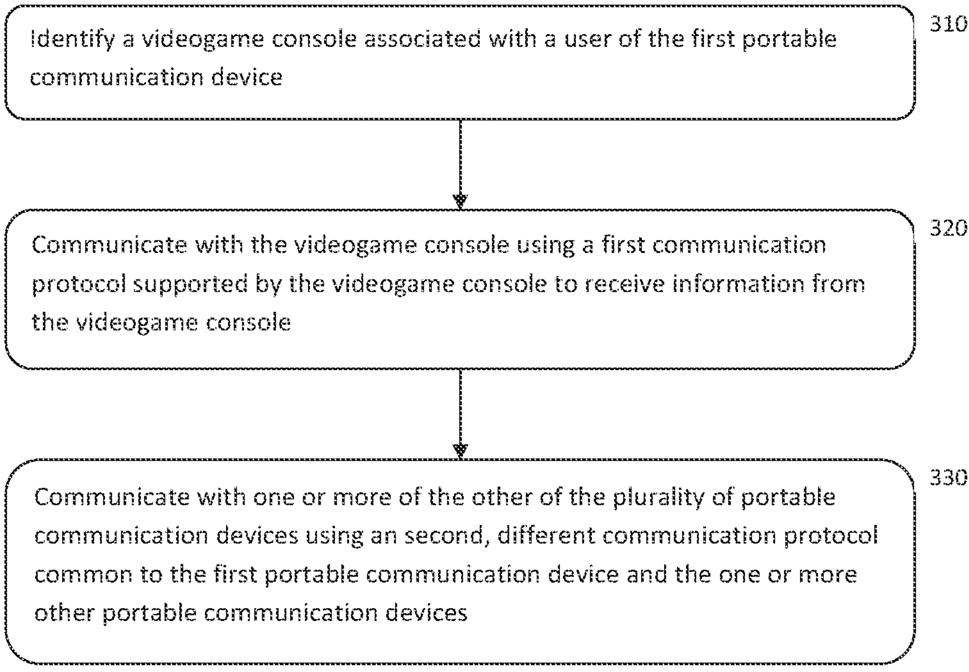
FIG. 3 is a flow diagram of a method of communication in accordance with embodiments of the present description.

Referring now also to FIG. 3, when run, the support app adapts the functionality the first portable communication device, for example by suitable software instruction, to perform the following method steps.

In a first step 310, identifying a videogame console associated with a user of the first portable communication device.

In one instance, this identification may be done by causing the first portable communication device to wirelessly poll for a videogame console using a polling signal recognised by that console. In the console may then respond, and a communication link based on a first communication protocol may be established.

The support app may comprise login credentials or other means by which the user may be identified to the videogame console. Alternatively or in addition the videogame console may indicate which user is currently logged into it, and the support app may verify that it is associated with the same user.

Alternatively or in addition, in another instance, this identification may be done by communicating the identity of the first portable communication devices user to a central server; for example the user may register their identity with an online service common to the support app and the videogame console; consequently when the user accesses the support app on their first portable communication device, their identity within the online service is associated with the respective videogame console.

The support app may then cause the first portable can the communication device to establish a communication link based on a first communication protocol via the online service (for example via an internet connection routed through the online service), or the online service may establish an internet peer-to-peer link for the first portable communication device and the videogame console, or the online service may communicate with the videogame console prompting it to initiate a handshake with the first portable communication device, or respond to a handshake from the first portable communication device, thereby in any of these cases establishing a communication link based on a first communication protocol.

Hence in a second step 320, the first portable communication device is configured to communicate with the videogame console using the first communication protocol supported by the videogame console to receive information from the videogame console, and optionally also provide user input to the videogame console.

Optionally, the support app may thus provide a second screen for the user on which information from the videogame console is displayed. This information may be graphical, such as an in-game map, or messages from remote players of a multiplayer game, or in game stats or inventory details, and the like.

Similarly optionally, the support app may thus provide an input means for the user by which information can be provided to the videogame console. This input may for example be via a touchscreen of the first portable communication device, and a graphical user interface may be provided to facilitate this. Alternatively or in addition, the input may take the form of video data captured by a camera of the first portable communication device, for example to capture the facial expressions, mouth movements, and/or gestures of the user, and either relay these or representation of them directly to the videogame console to be parsed for input, or parse these locally to generate inputs to send to the videogame console.

Figure 4:
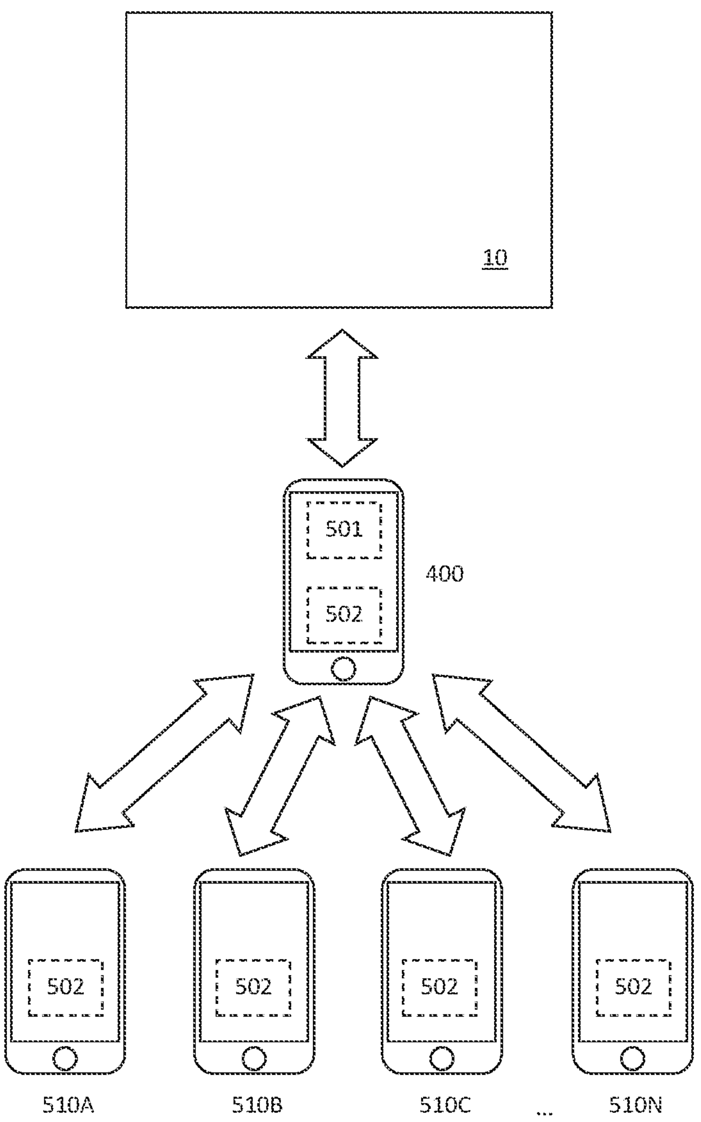
FIG. 4 is a schematic diagram of an ad hoc videogame console system, in accordance with embodiments of the present description.

However in an embodiment of the present description, and referring now to FIG. 4, in a third step 330 the first portable communication device is adapted by the support app 501 to communicate with one or more other of a plurality of portable communication devices (510A . . . N) using a second, different communication protocol common to the first portable communication device and the one or more other portable communication devices, to relay information from the videogame console to the one or more other portable communication devices. The other portable communication devices (510A . . . N) may be substantially similar to the first portable publication device, and together may for example form an arbitrary collection of commonly used smart phones and/or tablets.

Depending on the nature of the second communication protocol, this information may comprise text, pictures, video, and the like, either in common to all the plurality of other portable communication devices or to respective devices or sub-groups of devices, as described later herein.

Optionally as well as relaying information out from the videogame console via the first portable communication device, the support app may be adapted to cause the first portable communication device to carry out the steps of associating the one or more other portable communication devices with respective inputs to the videogame console, and communicating with the videogame console to relay respective input data received from the one or more other portable communication devices as respective inputs.

In this way, each of the other portable communication devices can be treated as a respective controller (as might the first portable communication device) for a respective participant (e.g. a respective player of the game or a respective spectator). The inputs may differ from or only partially overlap those of a conventional physical videogame controller, in recognition of the different form factor and modes of input inherent in portable communication devices such as smartphones and tablets.

For example, the touch screen of the phone may emulate the touch panel of a Dual Sense® controller, and/or buttons of such a controller may be emulated via a graphical UI (for example supplied as a picture or video feed according to the second communication protocol, as explained later herein.

A notable feature of the present application is that the or each other portable communication device does not download or install the app for the purposes of this communication (although of course if it happens at one of the other portable communication devices has the support app, then optionally this may be used for example provide an enhanced experience, as described later herein).

Rather, an existing communication protocol or communication app (502) using such a protocol and already shared between all the communication devices is used for this purpose.

Hence in a first instance the second communication protocol is at least one selected from the list consisting of a short range wireless messaging protocol, and a text or multimedia messaging service protocol, typically supported by an chat app using that protocol.

The short range wireless messaging protocol may for example be Bluetooth®-based, and enable the transmission of text and or multimedia messages. Alternatively so-called short message service 'SMS' or multimedia message service 'MMS' messaging may be used via a phone network. Optionally both approaches may be used as a combined second communication protocol.

An advantage of these protocols as they do not require any of the other portable communication devices to connect to a home Wi-Fi of the user of the first portable communication device, since Bluetooth uses direct communication, and the other services use the phone network.

Using either of these protocols, information may be sent from the videogame console to the plurality of other portable communication devices or respective ones or subsets of them via the first portable communication device, and optionally messages may be sent back, either to be parsed into inputs by the support app of the first portable communication device or relayed directly to the videogame console.

Users of these other portable communication devices may use text to create their inputs, and optionally this text can comprise emojis. In particular, emojis corresponding to directions (e.g. arrows) or specific objects or actions may be used and interpreted as corresponding inputs. On most smartphones the most recently used emojis are made readily available, making such input straightforward. Optionally as part of an introductory message to the other portable communication devices, the relevant emojis for input to the videogame console can be included so that the user can see which emojis they can pick, and can easily copy them from the introductory message (or forward the message back as an acknowledgement so that the emojis are added to the recently used list in their chat app's input user interface).

Hence in this way the support app is adapted to cause the first portable communication device to carry out the step of parsing respective input data received from the one or more other portable communication devices (e.g. separately via the second communication protocol) into a format appropriate to the first communication protocol, and associating the input data with a respective input to the videogame console before transmitting the input data, associated with the respective input, to the videogame console. This format conversion between the respective protocols may be separate to any additional optional parsing performed by the first portable communication device to convert inputs from one or more other portable communication devices into a different form of input for an application of the videogame console. By way of a non-limiting example, if the first portable communication device receives a left arrow emoji from another portable communication device, this emoji may be forwarded to the videogame console (together with an input ID) using the first communication protocol so that it can be interpreted by the videogame console, but alternatively it may be interpreted by the app has a left button input of a virtual controller, and then transmit this virtual input to the videogame console (together with an input ID typically corresponding to a virtual controller ID). This latter approach means that optionally an application on the videogame console can advantageously operate transparently without adaptation to handle inputs from the communication devices.

Examples of chat apps for such messaging services include SMS and MMS apps that come as standard on most mobile phones, various Bluetooth® chat apps, and other common chat apps such as Facebook® Messenger, WhatsApp®, and the like. Typically, within a group of friends there is likely to be one chat app that they already have installed in common.

The support app that was downloaded onto the first portable communication device may be granted permission to access the relevant chat app in order to input an extract messaging data. For example a chat app may provide an API to assist with such machine interaction. Alternatively or in addition the support app may simulate keyboard inputs in order to paste outgoing messages into the chat app, and/or copying incoming messages out of the chat app (for example by simulating keyboard inputs to select and copy messages). Where necessary, the app may use a screen grab and optical character recognition to extract messages from the chat app if no other option is available, with suitable permissions (for example only when running the downloaded app, and/or only when also in communication with a videogame console, discarding screen grabs once used, and only performing OCR if the relevant chat app is maximised on screen). Thus optionally the support app may comprise different strategies for interfacing with different common chat apps.

Meanwhile in a second instance the second communication protocol is a video chat protocol, typically supported by an video chat app using that protocol. There are many common video chat apps, including Facebook® Messenger, WhatsApp®, Zoom®, Google Duo®, Skype®, and the like. Again typically, within a group of friends there is likely to be one video chat app that they already have installed in common.

Again the support app may be granted permission to access the relevant video chat protocol, for example using an API. Alternatively or in addition, the support app may be granted permission to supply a video feed or overwrite an existing camera feed so that image data generated either by the support app or received from the videogame console can be incorporated into the video chat.

In this way, the support app is adapted to cause the first portable communication device to carry out the step of supplying the video chat with graphics data either supplied by the videogame console or generated by the first portable communication device, for example under the instruction of the video game console.

This allows a live video feed under the direction of the videogame console to be provided to each of the other portable communication devices (and indeed optionally the first portable communication device). As noted previously herein, this video feed may be supplied common to all of the other portable communication devices, or where the respective video chat app supports breakout rooms or similar parallel private sessions, different respective video feeds may be provided to respective other portable communication devices or subgroups thereof.

As noted elsewhere herein, the supplied graphics may comprise graphical information such as a map or a character identity, and/or textual information such as information ab out the current status of the user of a particular other portable communication device in an application of the videogame console (for example their virtual health, or their role in a current game—for example if they are 'it' or supposed to lie instead of telling the truth etc., in a guessing game).

Optionally in addition to or instead of providing images (graphical and/or textual), the feed may provide audio, in the form of music, and/or pre-recorded or synthesised speech.

In a similar manner to the first instance for text chat, optionally the support app may also parse respective input data received from the one or more other portable communication devices into a format appropriate to the first communication protocol, and associating the input data with a respective input to the videogame console In this case, the input data may comprise video and/or audio data captured by the video chat app. In this case the video as such audio may again be converted to the first communication protocol and sent to the videogame console, and/or wholly or partially parsed to create inputs before these are sent to the videogame console using the first communication protocol. For example, facial expressions may be recognised and used to drive in-game avatars, or similarly gestures such as nodding or shaking of heads may be used as yes/no inputs, or other gestures may be used to other effect. Similarly audio may be parsed into text, and optionally thereon into other input commands, before being sent to the videogame console. Again touches to the touchscreen of the respective other portable communication device may be relayed to the first portable communication device if the video chat app supports this. Optionally users may be asked to select a mode on the app where touch is detectable; for example an editing mode that displays a reticule, or as a mark in the default colour to the image, so that the reticule or mark can be detected in the image subsequently received by the first portable communication device to indicate the point of touch. Where touch can be conveyed, then the lease part of the graphical feed may comprise a user interface enabling easier input by the user of a respective one of the other portable communication devices.

Again, in order to obtain the video and/or audio the support app may intercept video and/or audio received by the video chat app, or make use of an API provided by the video chat app, or take regular screenshots to capture expressions and/or apparent gestures, as appropriate. Optionally to facilitate the latter option, such video-based responses may be limited to a short timeframe in which screenshots are taken at a higher frequency; for example users may be given a five second window in which to make their response and during this time screenshots are taken every 1/N seconds, where N is for example in the range 2-30, and for example 10.

It will be appreciated that some video chat apps also support text chat, and so the second communication protocol may comprise a combination of modes of communication, and indeed may comprise separate parallel communication protocols collectively referred to as a second communication protocol herein; for example a mixture of SMS text and video calls.

Preferably, all the portable communication devices use the same second communication protocol (e.g. the same messaging app or set of messaging apps), but optionally the support app may interact with several different messaging apps if subsets of the group share non-overlapping second communication protocols with the first portable can the communication device. For example two friends may use WhatsApp and two friends may use Facebook messenger, in which case the user of the first portable communication device can use both apps, with respective communications going to respective users and the support app providing respective data to and obtaining respective data from these messaging apps as appropriate.

Meanwhile if one of the other portable communication devices also comprise a copy of the support app (for example because the user of that device also has their own videogame console which they may or may not be using at the time), then the support app may comprise a native second protocol for text, audio, and/or video communication as appropriate, and/or interact with the separate (text) chat app or video chat app on the other portable communication device to enhance that user's experience, for example by providing additional graphical overlays, or separate additional messaging. Alternatively, optionally the support app on that other portable can the communication device may do nothing so that all the other portable communication devices interact with the first portable communication device in the same way Advantageously, by using the methods and techniques described herein, a group of users can interact with a videogame console via their portable communication device without having to download a dedicated app to their phone or tablet, or register such an app with a particular videogame console or other service, or more generally adapt their portable communication device to directly communicate with the videogame console or be compatible with its communication protocol, or otherwise link directly with the videogame console, in order to collectively play together on the videogame console; instead only one user downloads such a dedicated support app to a first portable communication device (typically that of the user who owns the videogame console), and then the group of users can connect to that first portable communication device using one or more messaging apps that they already use. This enables spontaneous and ad hoc use of the videogame console in a similar manner to when a group of users pick up physical handheld controllers to play with the videogame console, thereby enabling similar ease of use either when such physical handheld controllers are not available, or when an app on the videogame console is designed to be used with respective screens or touchscreens for each user.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence in embodiments of the present description, a computer program comprising computer executable instructions (e.g. the support app) is adapted to cause a first portable communication device to perform the method outlined elsewhere herein, comprising identifying a videogame console associated with a user of the first portable communication device, communicating with the videogame console using a first communication protocol supported by the videogame console to receive information from the videogame console, and communicating with one or more other of a plurality of portable communication devices using an second communication protocol common to the first portable communication device and the one or more other portable communication devices, to relay information from the videogame console.

Similarly, in a summary embodiment of the present description, when running under suitable software instruction by such a support app, a first portable communication device 400 comprises the following.

A console identification processor (for example CPU 410) adapted (for example by suitable software instruction) to identify a videogame console (10) associated with a user of the first portable communication device.

A communication processor (for example CPU 410 together with wireless communication means 440) adapted (for example by suitable software instruction) to communicate with the videogame console (10) using a first communication protocol supported by the videogame console to receive information from the videogame console.

The communication processor being adapted (again for example by suitable software instruction) to communicate with one or more other of a plurality of portable communication devices (510A . . . N) using a second, different communication protocol common to the first portable communication device and the one or more other portable communication devices, to relay information from the videogame console.

It will be apparent to a person skilled in the art that variations in the above first portable communication device corresponding to the various embodiments of the method as described and claimed herein are considered within the scope of the present invention, including but not limited to that:

- the first portable communication device comprises an input processor (for example CPU 410 together with wireless communication means 440) adapted (for example by suitable software instruction) to associate the one or more other portable communication devices with respective inputs to the videogame console, and wherein the communication processor is adapted to communicate with the videogame console to relay respective input data received from the one or more other portable communication devices as respective inputs, as described elsewhere herein;
- the second communication protocol is at least one selected from the list consisting of a short range wireless messaging protocol, and a text or multimedia messaging service protocol, as described elsewhere herein;
- the second communication protocol is a video chat protocol, as described elsewhere in;
- in this case, optionally a graphics processor (for example GPU 416 and/or CPU 410) adapted (for example by suitable software instruction) to supply the video chat with graphics data either supplied by the videogame console or generated by the first portable communication device under the instruction of the video game console, as described elsewhere herein;
- similarly in this case, optionally the communication processor is adapted to parse respective input data received from the one or more other portable communication devices into a format appropriate to the first communication protocol, and associating the input data with a respective input to the videogame console, and the communication processor is adapted to transmit the input data, associated with the respective input, to the videogame console, as described elsewhere herein.

It will be appreciated that collectively, the first portable communication device, together with one or more other portable application devices as described elsewhere herein, may collectively form a videogame console input system.

Furthermore the videogame console input system, together with a videogame console, may collectively form an ad hoc videogame console system, such as that illustrated in FIG. 4.

Furthermore the ad hoc videogame console system, together with a central server as disclosed elsewhere herein (not shown), may collectively form a centrally supported ad hoc videogame console system.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of communication for a plurality of portable communication devices and a videogame console, the method comprising:

installing a first software application on a first portable communication device, the first software application adapted to cause the first portable communication device to perform operations comprising:

identifying the videogame console operating a second software application, wherein the videogame console is associated with a user of the first portable communication device;

receiving, from the videogame console using a first communication protocol supported by the videogame console and the first software application installed on the first portable communication device, information of the second software application operating on the videogame console; and receiving, from one or more of the plurality of portable communication devices using a second communication protocol different than the first communication protocol supported by (i) a third software application installed on the plurality of portable communication devices and (ii) the first software application installed on the first portable communication device, data indicating respective inputs to the second software application operating on the videogame console generated using the third software application, different from the second software application operating on the videogame console, operating on the one or more portable communication devices.

2. The method of claim 1, comprising:

associating the one or more portable communication devices with the respective inputs to the second software application operating on the videogame console; and communicating with the videogame console to relay respective input data received from the one or more portable communication devices as respective inputs.

3. The method of claim 1, wherein receiving the data indicating the respective inputs to the second software application operating on the videogame console comprises receiving data corresponding to at least one of:

i. a short range wireless messaging protocol; and ii. a text or multimedia messaging service protocol.

4. The method of claim 3, comprising:

parsing the received data generated using the third software application from the one or more portable communication devices into a format appropriate to transmit to the videogame console, and associating the received data with a respective input to the videogame console; and transmitting the parsed data, associated with the respective input, to the videogame console.

5. The method of claim 1, in which the third software application is a video chat application configured to generate data corresponding to a video chat protocol, wherein the method comprises:

receiving, from the one or more portable communication devices operating the video chat application, input data for controlling the videogame console; and transmitting, by the first portable communication device operating the first software application, one or more controls indicated by the input data to the videogame console.

6. The method of claim 5, comprising:

transmitting, to the one or more portable communication devices operating the third software application, graphics data either supplied by the videogame console or generated by the first portable communication device under instruction of the videogame console.

7. The method of claim 5, comprising:

parsing the received data generated using the third software application from the one or more portable communication devices; and transmitting the parsed data to the videogame console.

8. One or more non-transitory computer storage media encoded with computer program instructions that when executed by one or more computers cause the one or more computers to perform operations comprising:

identifying, by a first software application operated on a first portable communication device, a videogame console operating a second software application;

receiving, from the videogame console using a first communication protocol supported by the videogame console and the first software application installed on the first portable communication device, information of the second software application operating on the videogame console; and receiving, from one or more of a plurality of portable communication devices using a second communication protocol different than the first communication protocol supported by (i) a third software application installed on the plurality of portable communication devices and (ii) the first software application installed on the first portable communication device, data indicating respective inputs to the second software application operating on the videogame console generated using the third software application, different from the second software application operating on the videogame console, operating on the one or more portable communication devices.

9. The media of claim 8, wherein the operations comprise:

associating the one or more portable communication devices with the respective inputs to the second software application operating on the videogame console; and communicating with the videogame console to relay respective input data received from the one or more portable communication devices as respective inputs.

10. The media of claim 8, wherein receiving the data indicating the respective inputs to the second software application operating on the videogame console comprises receiving data corresponding to at least one of:

i. a short range wireless messaging protocol; and ii. a text or multimedia messaging service protocol.

11. The media of claim 10, wherein the operations comprise:

parsing the received data generated using the third software application from the one or more portable communication devices into a format appropriate to transmit to the videogame console, and associating the received data with a respective input to the videogame console; and transmitting the parsed data, associated with the respective input, to the videogame console.

12. The media of claim 8, in which the third software application is a video chat application configured to generate data corresponding to a video chat protocol, wherein the operations comprise:

receiving, from the one or more portable communication devices operating the video chat application, input data for controlling the videogame console; and transmitting, by the first portable communication device operating the first software application, one or more controls indicated by the input data to the videogame console.

13. The media of claim 12, wherein the operations comprise:

transmitting, to the one or more portable communication devices operating the third software application, graphics data either supplied by the videogame console or generated by the first portable communication device under instruction of the videogame console.

14. The media of claim 12, wherein the operations comprise:

parsing the received data generated using the third software application from the one or more portable communication devices; and transmitting the parsed data to the videogame console.

15. A system comprising:

one or more computers and one or more storage devices on which are stored instructions that are operable, when executed by the one or more computers, to cause the one or more computers to perform operations comprising:

identifying, by a first software application operated on a first portable communication device, a videogame console operating a second software application;

receiving, from the videogame console using a first communication protocol supported by the videogame console and the first software application installed on the first portable communication device, information of the second software application operating on the videogame console; and receiving, from one or more of a plurality of portable communication devices using a second communication protocol different than the first communication protocol supported by (i) a third software application installed on the plurality of portable communication devices and (ii) the first software application installed on the first portable communication device, data indicating respective inputs to the second software application operating on the videogame console generated using the third software application, different from the second software application operating on the videogame console, operating on the one or more portable communication devices.

16. The system of claim 15, wherein the operations comprise:

associating the one or more portable communication devices with the respective inputs to the second software application operating on the videogame console; and communicating with the videogame console to relay respective input data received from the one or more portable communication devices as respective inputs.

17. The system of claim 15, wherein receiving the data indicating the respective inputs to the second software application operating on the videogame console comprises receiving data corresponding to at least one of:

i. a short range wireless messaging protocol; and ii. a text or multimedia messaging service protocol.

18. The system of claim 17, wherein the operations comprise:

parsing the received data generated using the third software application from the one or more portable communication devices into a format appropriate to transmit to the videogame console, and associating the received data with a respective input to the videogame console; and transmitting the parsed data, associated with the respective input, to the videogame console.

19. The system of claim 15, in which the third software application is a video chat application configured to generate data corresponding to a video chat protocol, wherein the operations comprise:

receiving, from the one or more portable communication devices operating the video chat application, input data for controlling the videogame console; and transmitting, by the first portable communication device operating the first software application, one or more controls indicated by the input data to the videogame console.

20. The system of claim 19, wherein the operations comprise:

transmitting, to the one or more portable communication devices operating the third software application, graphics data either supplied by the videogame console or generated by the first portable communication device under instruction of the videogame console.

* * * * *